Nov. 10, 1936.  H. S. VINCENT  2,060,434
APPARATUS FOR COOKING
Original Filed April 13, 1929  3 Sheets-Sheet 2
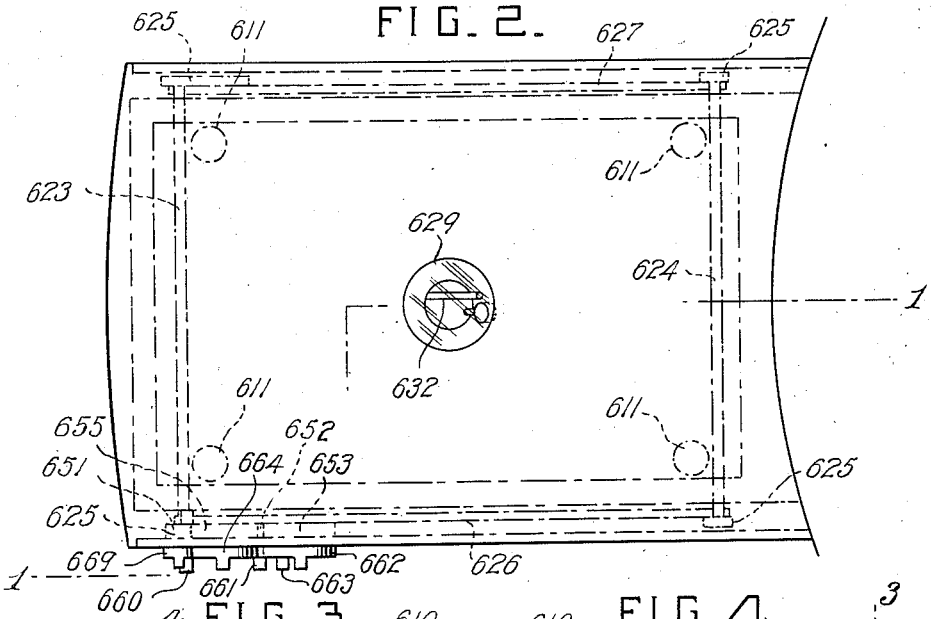
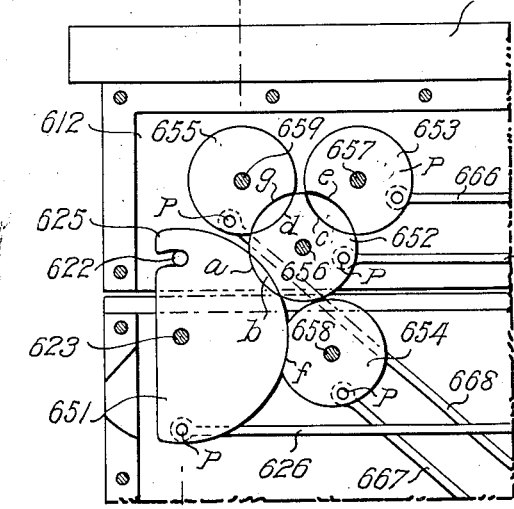
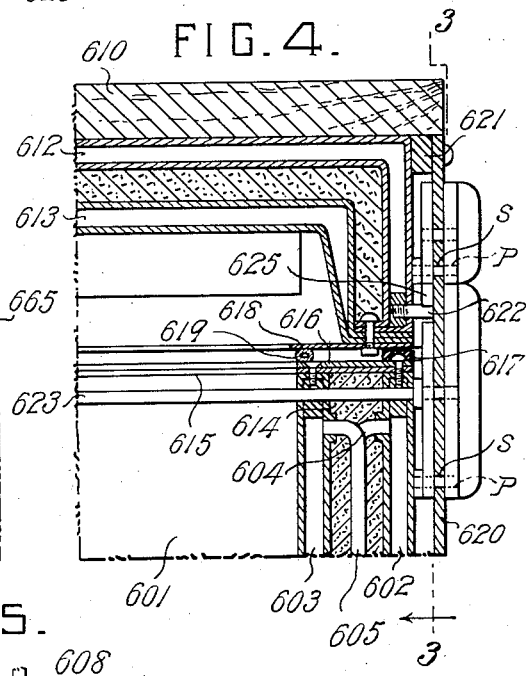
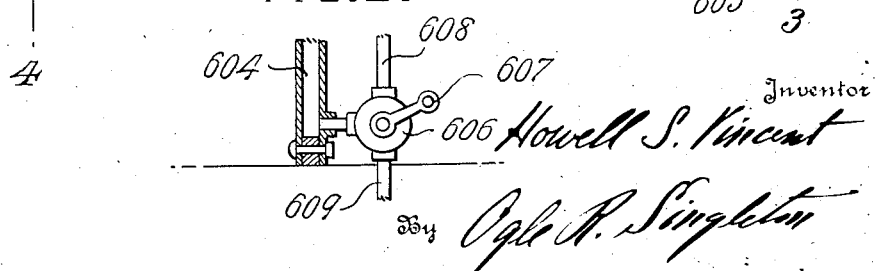
Inventor
Howell S. Vincent
By Ogle R. Singleton
Attorney

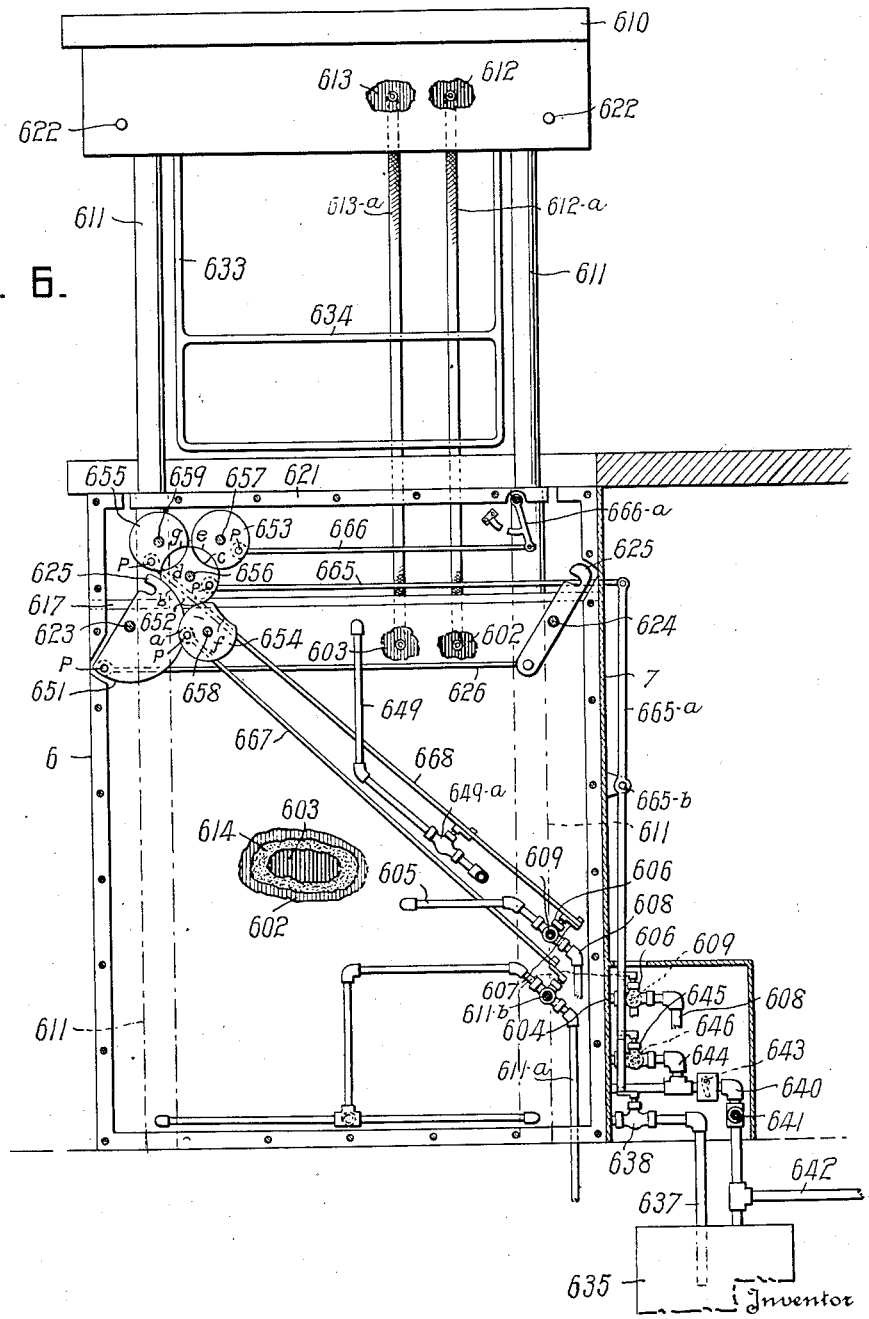

Patented Nov. 10, 1936

2,060,434

UNITED STATES PATENT OFFICE 2,060,434

APPARATUS FOR COOKING

Howell S. Vincent, Brookline, Mass.

Original application April 13, 1929, Serial No. 354,967. Divided and this application January 23, 1930, Serial No. 422,962

7 Claims. (Cl. 126—20)

My invention consists in a new and useful improvement in apparatus for cooking and is designed more particularly to provide a pressure cooker. This application is a divisional application from my application Serial Number 354,967 filed in the United States Patent Office on April 13, 1929.

The particularly novel and useful features of the invention described and claimed herein are the means which I provide for supplying to my device the steam required for a pressure cooker, the means for controlling the operative mechanism and the means for securing and maintaining the proper sealing of the cooking chamber during the cooking process.

In the drawings:

Fig. 2 is a top plan view.

Fig. 3 is a vertical section on line 3—3 of Fig. 4.

Fig. 4 is a vertical section on line 4—4 of Fig. 3.

Fig. 5 is a side elevation, partly in section, of a detail of a water valve.

Fig. 6 is a vertical section illustrating the means for controlling the operative mechanisms.

Figure 1:
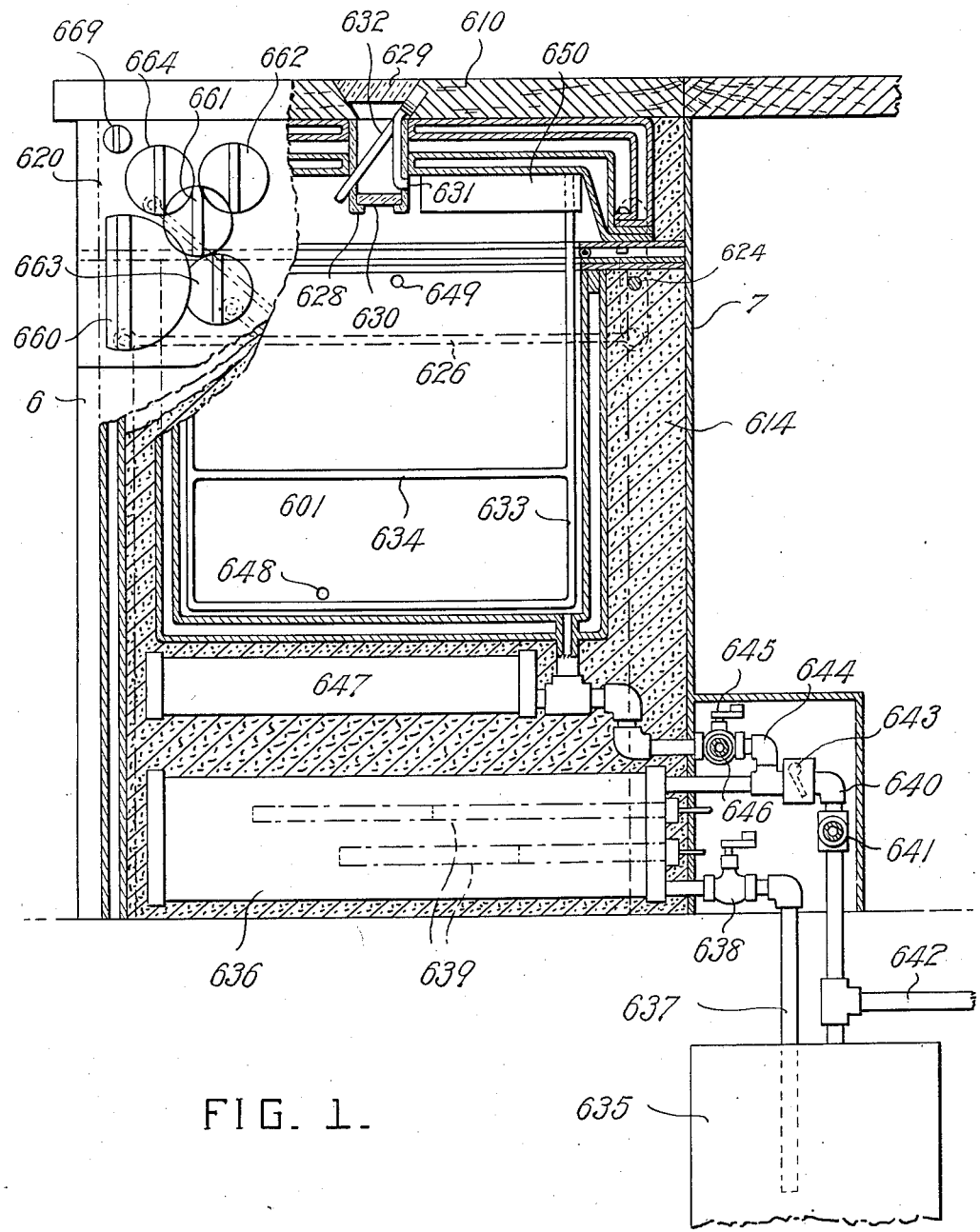
Fig. 1 is a vertical section on the line 1—1 of Fig. 2.

Between the walls 6 and 7 I provide the insulated chamber 601 having the outer water jacket 602 and the inner water jacket 603 having independent supply pipes 604 and 605 respectively. The pipe 604 is provided at its end at the bottom of the cooker with a three-way cock 606 having the operating handle 607, the supply pipe 608 and the waste pipe 609. The pipe 605 is also provided with a similar cock. The chamber 601 has a vertically movable top 610 mounted upon elevating means 611 comprising pneumatically operated tubes for which I provide the air supply pipe 611a having the valve 611b. The top 610 has an outer water jacket 612 and an inner water jacket 613 provided with extensible hose connections 612a and 613a respectively, connected with the water jackets 602 and 603 respectively.

The insulated wall 614 of the chamber 601 is provided at its top with a circumferential plate 615 on which is mounted a rubber gasket 616, on which at its outer edge is mounted the rubber buffer 617. To the lower side of the top 610 there is suitably attached the circumferential flexible back pressure lip 618 which extends inwardly from the lower edge of the top 610, and carries at the inner edge the cylindrical rubber gasket 619 to co-act with the gasket 616.

Suitably mounted on the outer face of the wall 614, there is a plate 620 which projects upwardly above the upper end of the wall 614, beside the top 610, fitted under the upper surface thereof, and braced by a strut 621 extending between the walls 6 and 7.

Suitably mounted at the four corners of the top 610, adjacent its lower edge, there are the pins 622. Suitably journaled in the wall 614 are the two rock-shafts 623 and 624, the former passing through the plate 620. Mounted on each end of these shafts 623 and 624, on the outside of the wall 614, is a hook 625 adapted to co-act with one of the pins 622 to lock the cover 610 upon the chamber 601. I connect the hook 625 located adjacent the wall 620 to one of the hooks 625 adjacent the wall 7 by a pitman rod 626 and also connect the other two hooks 625 by a similar rod 627.

At a suitable point in the upper surface of the top 610, there is provided a well 628 closed at its top and bottom by transparent plates 629 and 630 respectively. In this well 628, there are provided a pressure gauge 631 and a thermometer 632 for indicating pressure and temperature within the chamber 601 when the top 610 is in closed position.

Suitably suspended from the top 610 and so disposed as to fit within the chamber 601 when the top 610 is in closed position, there is the skeleton frame 633 with any suitable arrangement of shelves 634 for receiving the material to be operated upon by the cooker.

I will now describe the mechanism which I provide for operating the cooker. (Illustrated in Fig. 1.)

Suitably disposed at any convenient point below the cooker, there is provided a tank 635 to which is constantly supplied water from the water mains (at a pressure varying from 40 to 90 pounds). In the lower portion of the cooker there is located the chamber 636 into the bottom of which enters the pipe 637 from the tank 635, having the valve 638 therein. It is to be noted that the pipe 637 is extended somewhat downwardly into the tank 635. In the chamber 636, there are provided electric heating coils 639. From the top of the chamber 636 there extends the pipe 640 which enters the top of the tank 635. From this pipe 640, I provide supply pipes 641 and 642, through the former of which I may convey heated water to a dish washer and sink, and through the latter of which I may supply heated water for other purposes. In the pipe 640 between the chamber 636 and the pipe 641 there is provided the check valve 643, so designed as to prevent flow from the tank 635 to the chamber 636 when the valve 643 is closed.

Leading from the pipe 640, at a point between the chamber 636 and the check valve 643, there is the pipe 644 which communicates with the interior of the chamber 601. This pipe 644 is provided with a three-way valve 645 for alternatively opening and closing the circuit from the chamber 636, to the chamber 601, and opening and closing the circuit from the chamber 601 to the waste pipe 646. I also provide a condensation chamber 647 connected with the pipe 644 immediately below the chamber 601.

Within the chamber 601, I provide a safety valve 648 and an air supply pipe 649 with a valve 649a, and on the lower surface of the cover 610 I provide any suitable form of electric hot plate 650.

I will now describe the means which I provide for manual control of the several mechanisms for the operation of the pressure cooker (see Fig. 6). I provide five discs 651, 652, 653, 654 and 655 rotatably mounted upon the inner face of the plate 620. The disc 651 is mounted upon the rock shaft 623 and serves to carry the hook 625. The other discs 652, 653, 654 and 655 are carried by pintles 656, 657, 658 and 659 respectively passing through the plate 620. Mounted upon the outer ends of the rock shaft 623 and the pintles 656, 657, 658 and 659 on the outer face of the plate 620 are the operating buttons 660, 661, 662, 663 and 664 respectively.

It is to be noted that the discs 651, 652, 653, 654 and 655 are of the same thickness and positioned in the same vertical plane, and they are so designed and disposed as to permit only a determined sequence of operations, thus obviating the possibility of improper actuation of the operative mechanisms. The relation of the discs 651, 652, 653, 654 and 655 relative to one another is determined by the location of the shaft 623 and the pintles 656, 657, 658 and 659 in the plate 620.

I will now describe the design of each of the discs 651, 652, 653, 654 and 655 (illustrated in Fig. 3). The disc 651 is provided on its periphery with the lune shaped notch $a$ having an arc corresponding with the circumference of the discs 652 and 654. The disc 652 is provided on its periphery with the lune shaped notch $b$ having an arc corresponding with the circumference of the disc 651, and the lune shaped notch $c$ having an arc corresponding with the circumference of the disc 653, and the lune shaped notch $d$ having an arc corresponding with the circumference of the discs 653 and 655. The disc 653 is provided on its periphery with the lune shaped notch $e$ having an arc corresponding with the circumference of the disc 652. The disc 654 has on its periphery a lune shaped notch $f$ having an arc corresponding with the circumference of the disc 651. The disc 655 has on its periphery a lune shaped notch $g$ having an arc corresponding with the circumference of the disc 652. It is to be understood that each of the operating buttons 660, 661, 662, 663 and 664 is designed to correspond in contour with its associated disc.

The disc 652 has pivoted thereto the pitman rod 665 which is connected with the rod 665a pivoted at 665b on the wall 7. This rod 665a is operatively connected with the handle 607 of the cock 606 on the pipe 604 of the outer water jacket 602, and the valves 638 and 645. The disc 653 has pivoted thereto the pitman rod 666 which is operatively connected with any suitable form of electric switch 666a to control the flow of electricity to the electric coils 639 in the chamber 636. The disc 654 has pivoted thereto the pitman rod 667 which is operatively connected with air valve 611b to control the operation of the elevating means 611 of the cover 610. The disc 655 has pivoted thereto the pitman rod 668 which is operatively connected with the cock 606 provided for the pipe 605 of the inner water jacket 603, and with the valve 649a of the air supply pipe 649.

The pitman rods 626, 665, 666, 667 and 668, are pivoted to the discs 651, 652, 653, 654 and 655 respectively by means of pintles $p$ which pass through slots $s$ in the plate 620, are fastened to the operating buttons 660, 661, 662, 663 and 664 respectively, and are suitably connected with and adapted to control the several mechanisms for the operation of the pressure cooker.

I provide, at any suitable point on the plate 620, an electric switch operating button 669, to control the flow of electric current to the hot plate 650 located in the top 610.

I will now describe the use and operation of the pressure cooker. It is to be noted that when the parts are in normal position the valve 638 is open and the valve 645 is closed so that water under pressure from the city water-main is supplied from the tank 635 through the pipe 637 filling the chamber 636 and the pipe 640. The circuit being in equilibrium, the check valve 643 is inoperative. The parts mounted upon the plate 620 being in normal position, the operator can turn the operating button 662 and with it the disk 653 operating the pitman 666 and thereby cause electric current to energize the heating coils 639 in the chamber 636, thus heating the water in the chamber 636. It is to be noted that by reason of the fact that the pipe 637 is extended downwardly into the tank 635 while the pipe 640 enters the top of the tank 635 the operation in the chamber 636 will cause cooler water to flow from the lower part of the tank 635 through the pipe 637 into the chamber 636 where it is heated and the heated water will pass from the chamber 636 through the pipe 640 into the upper part of the tank 635. It is obvious that the water thus heated may be supplied through the pipe 641 to a dish washer or sink, or through the pipe 642 for any other desired purpose.

When it is desired to use the pressure cooker, the disk 651 mounted on the plate 620 is moved by its associated operating button 660 so that the hooks 625 are disengaged from the pins 622. This movement of the disk 651 brings the notch $a$ opposite the notch $f$ in the disk 654, thus permitting rotation of the disk 654, by means of the associated operating button 663, which opens valve 611b in the air supply pipe 611a and causes the elevating means 611 to lift the top 610 of the pressure cooker, raising with it the skeleton frame 633 and shelves 634, providing facilities for disposing food which is to be cooked, in the chamber 601 of the pressure cooker. When the articles have been placed upon the shelves 634, the disk 654, is again manipulated by the operating button 663 to cause the top 610 to return to normal position and the disk 654 is then restored to its normal position, under which conditions it is possible to rotate the disk 651 by its associated operating button 660 to cause the hooks 625 to engage the pins 622, thereby locking the top 610 upon the chamber 601. It is to be noted that by reason of the design and disposition of the hooks 625 and the pins 622 a certain degree of pressure downwardly is exerted upon the top 610 by the action of the hooks 625, which causes the top 610 to press the back pressure lip 618 and its gasket 619 upon the gasket 616 on the top of the wall 614 of the chamber 601. The disk 651 being in normal position the notch $a$ permits clockwise rotation of the disk 652 by means of its associated operating button 661. This operation, through the pitman rod 665 and rod 665a closes the valve 638 and opens the valve 645, and also opens the valve 606 permitting water to flow from the pipe 608 through the pipe 604 and the outer water jackets 602 and 612. This operation causes the heating system below the cooker to supply steam to the chamber 601 through the pipe 644, the safety valve 648 maintaining any desired pressure. It is to be noted that by reason of the design and disposition of the back-pressure lip 618 the steam pressure in the chamber 601 causes this lip 618 to seal the joint between its gasket 619 and the gasket 616. The operation of the cooker during the cooking process may be observed by inspection of the pressure gauge 631 and the thermometer 632 in the well 628. When the cooking process has been completed, the disk 652 is restored to normal position, thereby opening the valve 638 and causing the valve 645 to close the passage in the pipe 644 from the chamber 636 and open the passage from the pipe 644 to the vent pipe 646, thereby permitting escape of the steam from the chamber 601 through the vent pipe 646. The movement of the disk 652 to normal position also causes the cock 606 to close the supply pipe 608 and open the waste pipe 609 thereby evacuating water from the outer water jacket 602 about the chamber 601 and the outer water jacket 612 in the top 610. The return of the disk 652 to normal position causes the notch *d* thereon to coincide with the notch *g* of the disk 655 which may then be rotated by means of its associated operating button 664, which operation through the pitman rod 668 opens the valve 606 of the pipe 605 and admits water to the inner water jacket 603 surrounding the chamber 601 and the inner water jacket 613 in the top 610, and also opens the valve 649a of the pipe 649 causing circulation of air through the chamber 601, pipe 644 and vent pipe 646. Attention is called to the fact that the circulation of water through the outer water jackets 602 and 612 serves to assist the effect of the insulation about the chamber 601 to prevent escape of heat into the room. The use of the inner water jackets 603 and 613, which are empty during the cooking process to supply air space surrounding the chamber 601 to assist the maintenance of the proper temperature for cooking in the chamber 601, and filled with circulating cold water immediately following the completion of the cooking process, serves to so lower the temperature in the chamber 601 immediately prior to opening the chamber 601 after the cooking process, that any disagreeable rush of heat into the room is obviated.

It is obvious that the cooker can be opened and the cooked food taken therefrom by the process already described.

It is to be noted that the pressure cooker may be opened and articles placed therein as previously explained, and it may then be closed and that the pressure cooking mechanism may remain inoperative and the cooking process performed by the heating element 650 controlled by the operating button 669.

Having described my invention, what I claim is:

1. In apparatus for cooking, the combination of a pressure cooker; an outer water jacket about said cooker; an inner water jacket about said cooker; and means adapted to alternatively supply water to said jackets and evacuate water from said jackets.

2. In apparatus for cooking, the combination of a pressure cooker; means adapted to supply steam to said cooker; means adapted to permit the escape of steam from said cooker; means adapted to purge said cooker by compressed air; and manual control means to render operative the steam supply means, and automatically and simultaneously render inoperative the said escape and purging means, and to render inoperative the steam supply means and automatically and simultaneously render operative the said escape and purging means.

3. In apparatus for cooking, the combination of a pressure cooking chamber; a vertically movable cover for said chamber; means adapted to move said cover; means adapted to lock said cover upon said chamber; means adapted to supply steam to said chamber; means adapted to evacuate steam from said chamber; and a plurality of interlocking manually-operated control means, each associated with one of the above-mentioned operating means, the whole set of control means being so designed and disposed that the steam supply means and steam evacuating means are operable only when the moving means for the cover is inoperative and the locking means is in locked position, and that the moving means and locking means are operable only when the steam supply and steam evacuating means are inoperative, and that the moving means is operative only when the locking means is in unlocked position.

4. In apparatus for cooking, the combination of a cooking chamber; a water heating chamber; two pipes entering said heating chamber, to which are supplied water under pressure, one of said pipes having therein a manually controlled valve, and the other pipe having a check valve so disposed as to be closed by the water pressure when the manually controlled valve of the other pipe is closed; a third pipe connected with the second pipe between the check valve and the heating chamber and also connected with the interior of the cooking chamber; and a manually controlled valve in said third pipe so connected with the manually controlled valve in the first pipe that when the first pipe is open the third pipe is closed, and vice-versa.

5. In apparatus for cooking, the combination of a cooking chamber; a steam generator; a pipe connecting the generator with the chamber to supply steam to the chamber; a vent pipe to permit the escape of steam from said chamber; a pipe connected with a source of air under pressure and communicating with the interior of said chamber; a three-way valve connected with the steam supply pipe and the steam vent pipe; a valve on the air supply pipe; and controls for the valves so designed and disposed that the steam supply pipe can be opened only when the air supply pipe and the steam vent pipe are closed, and the air supply pipe and the steam vent pipe can be opened only when the steam supply pipe is closed.

6. In apparatus for cooking, the combination of a pressure cooking chamber; a vertically movable cover for said chamber; means adapted to move said cover; means adapted to supply steam to said chamber; and control means so designed and disposed that the moving means and the steam supply means are operable only alternatively.

7. In apparatus for cooking, the combination of a pressure cooking chamber; a vertically movable cover for said chamber; means adapted to move said cover; means adapted to lock said cover upon said chamber; means adapted to supply steam to said chamber; and a plurality of control means, each associated with one of the above-mentioned operating means, the whole set of control means being so designed and disposed that the steam supply means is operable only when the moving means for the cover is inoperative and the locking means is in locked position, and that the moving means and locking means are operable only when the steam supply means is inoperative, and that the moving means is operative only when the locking means is in unlocked position.

H. S. VINCENT.